(12) United States Patent
Fong

(10) Patent No.: US 8,444,178 B2
(45) Date of Patent: May 21, 2013

(54) AIRBAG APPARATUS

(76) Inventor: Jian-Jhong Fong, Changhua (TW)

( * ) Notice: Subject to any disclaimer, the term of this patent is extended or adjusted under 35 U.S.C. 154(b) by 0 days.

(21) Appl. No.: 13/503,848

(22) PCT Filed: Oct. 28, 2009

(86) PCT No.: PCT/CN2009/074672
§ 371 (c)(1),
(2), (4) Date: Apr. 24, 2012

(87) PCT Pub. No.: WO2011/050526
PCT Pub. Date: May 5, 2011

(65) Prior Publication Data
US 2012/0211972 A1    Aug. 23, 2012

(51) Int. Cl.
*B60R 21/16*    (2006.01)
(52) U.S. Cl.
USPC .............................. 280/735; 280/732; 701/45
(58) Field of Classification Search
CPC ....................................................... B60R 21/16
USPC .............................. 280/728.1–743.2; 701/45
See application file for complete search history.

(56) References Cited

U.S. PATENT DOCUMENTS

| 5,793,005 A | * | 8/1998 | Kato ....................... 200/61.45 R |
| 2006/0267319 A1 | * | 11/2006 | Frisch et al. .................. 280/731 |
| 2009/0306857 A1 | * | 12/2009 | Katz et al. ....................... 701/45 |

* cited by examiner

*Primary Examiner* — Paul N Dickson
*Assistant Examiner* — Timothy Wilhelm

(57) ABSTRACT

An airbag apparatus is provided with at least one detent assembly each including a micro switch, a telescopic cylinder slidably disposed in the micro switch, a bifurcation for fastening the cylinder by attaching to the micro switch, a first rope secured to the micro switch, and a second rope secured to the bifurcation wherein the micro switch is open in an inoperative position; an airbag; a cover spaced around the airbag; sensors disposed in an automobile; and an ECU for controlling the airbag and the sensors. The airbag is surrounded and fastened by the first and second ropes of the detent assemblies. The airbag expands to close the micro switch and break loose when an actual accident event is sensed by at least one of the sensors.

7 Claims, 10 Drawing Sheets

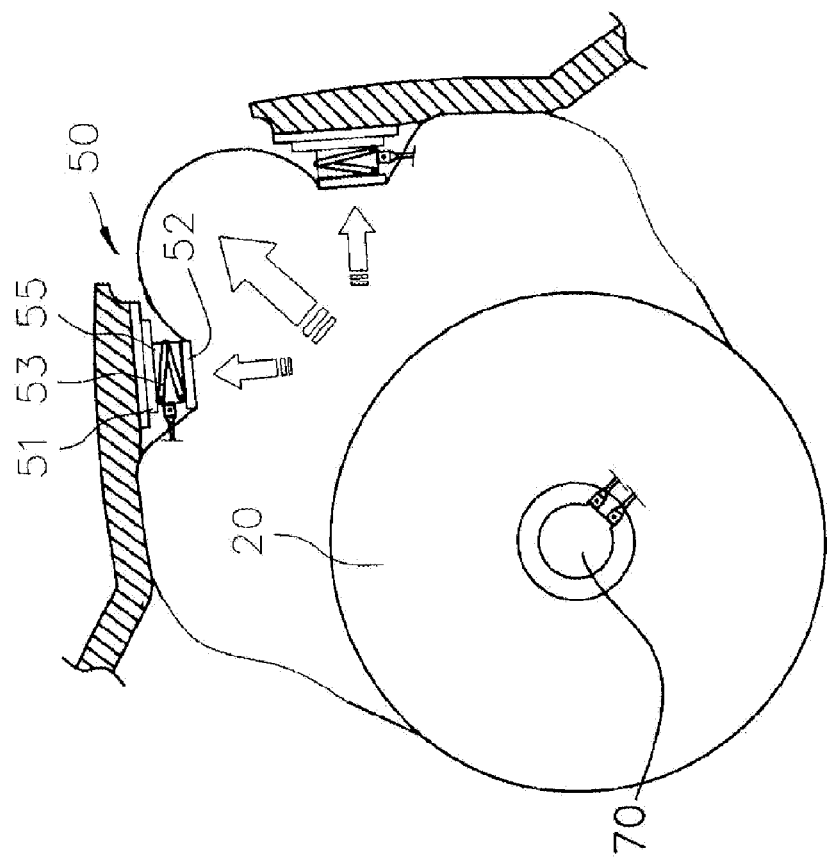
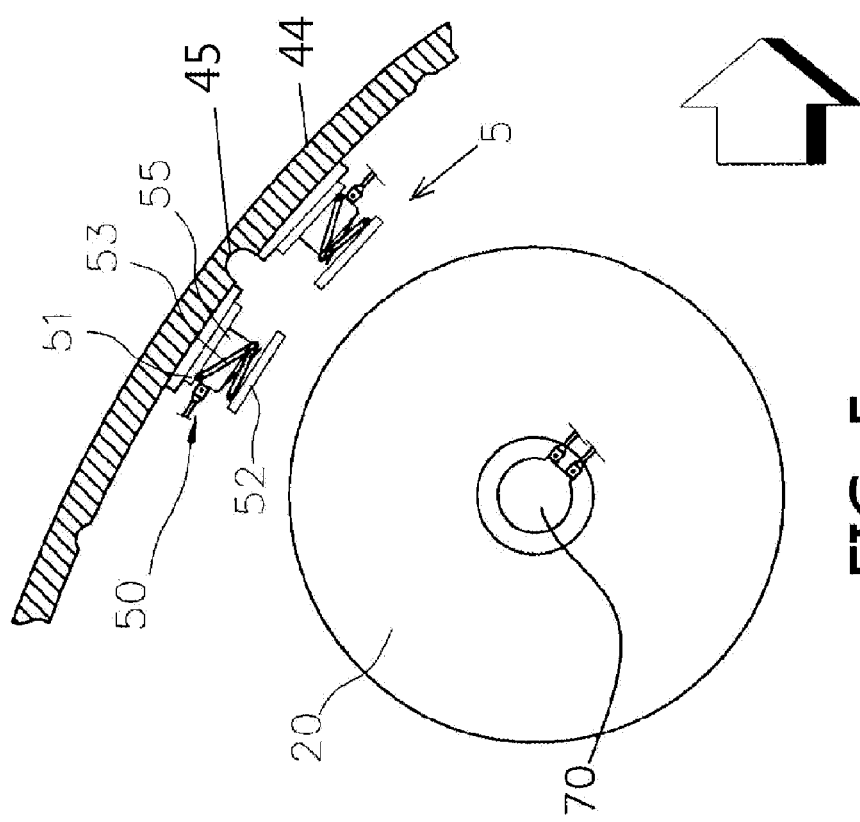
FIG. 6
FIG. 5

AIRBAG APPARATUS

BACKGROUND OF THE INVENTION

1. Field of the Invention

The invention relates to automobile airbags and more particularly to such an airbag apparatus having sensors for sensing signals from front, rear, and both sides of an automobile so as to provide a maximum safety to passengers in the automobile when driving.

2. Description of Related Art

An airbag is a vehicle safety device. It is an occupant restraint system consisting of a flexible envelope designed to inflate rapidly during an automobile collision. Its purpose is to cushion occupants during a crash and provide protection to their bodies when they strike interior objects such as the steering wheel or a window. Modern vehicles may contain multiple airbags in both sides and frontal locations of the passenger seating positions. Sensors may deploy one or more airbags in an impact zone at variable rates based on the type and severity of impact. The airbag is designed to only inflate in moderate to severe frontal crashes. In automotive electronics, electronic control unit (ECU) is a generic term for any embedded system that controls one or more of the electrical systems or subsystems in a motor vehicle.

Moreover, fire may occur when an automobile collides with at least one car or others. Thus, modern vehicles may be equipped with fire extinguishers for extinguishing fire once it occurs. In addition, DVD, GPS, 3G, etc. are becoming requisite components of modern vehicles. Thus, how to integrate above electronic devices with a safety system of a vehicle is an issue to be addressed.

A first conventional airbag apparatus is shown in FIG. 1 and comprises an airbag 20, an ECU 10 connected to the sensors 20 via a cable 15, a sensor 11 controlled by the ECU 10, an electric door lock 90 controlled by the ECU 10, and a battery 80 for supplying electricity to the battery 90 via an electric wire 35.

A second conventional airbag apparatus is shown in FIG. 2 and comprises an airbag 20, an ECU 10 connected to the airbag 20 via a cable 15, a sensor 11 controlled by the ECU 10, an electric door lock 90 controlled by the ECU 10, a battery 80 for supplying electricity to the battery 90 via an electric wire 35, and a fire extinguisher 30 connected to both the airbag 20 and the ECU 10 via a cable 15. However, both typical airbag apparatuses are not reliable in use due to poor design. Thus, the need for improvement still exists.

SUMMARY OF THE INVENTION

It is therefore one object of the invention to provide an airbag apparatus of an automobile comprising an ECU; a plurality of detent assemblies each comprising a restraint member, a base secured to a cover, a plate member spaced from the base, two toggle arms interconnecting the base and the plate member, and a micro switch attached to the restraint member, the micro switch disposed on the base and under the plate member, the micro switch disabled in an inoperative position; a telescopic cylinder extending from the micro switch to terminate at the plate member; an airbag; a cover spaced around the airbag; and a plurality of sensors disposed in an automobile; wherein the airbag expands to break the cover when an actual accident event is sensed by at least one of the sensors.

Another object of the invention is to provide an airbag apparatus of an automobile comprising an ECU; two detent assemblies each comprising a micro switch, a telescopic cylinder slidably disposed in the micro switch, a bifurcation for fastening the cylinder by attaching to the micro switch, a first rope secured to the micro switch, and a second rope secured to the bifurcation wherein the micro switch is disabled in an inoperative position; an airbag; a cover spaced around the airbag; and a plurality of sensors disposed in an automobile; wherein the airbag is surrounded and fastened by the first and second ropes of the detent assemblies; and wherein the airbag expands to break loose when an actual accident event is sensed by at least one sensor.

Still another object of the invention is to provide an airbag apparatus of an automobile comprising an ECU; two detent assemblies each comprising a micro switch, a telescopic cylinder slidably disposed in the micro switch, a bifurcation for fastening the cylinder by attaching to the micro switch, a first rope secured to the micro switch, and a second rope secured to the bifurcation wherein the micro switch is disabled in an inoperative position; an airbag; a cover spaced around the airbag; and a plurality of sensors disposed in an automobile; wherein one of the sensors is disposed at one end of the airbag; wherein the airbag is surrounded and fastened by the first and second ropes of the detent assemblies; and wherein the airbag expands to break loose when an actual accident event is sensed by at least one sensor.

The above and other objects, features and advantages of the invention will become apparent from the following detailed description taken with the accompanying drawings.

BRIEF DESCRIPTION OF THE DRAWINGS

FIG. 5 is a side elevation in part section of an airbag, the detent assemblies and a cover mounted in an automobile;

FIG. 6 is a view similar to FIG. 5 showing the airbag expanding to break the cover when a traffic accident occurs;

DETAILED DESCRIPTION OF THE INVENTION

Referring to FIGS. 3 to 13, an airbag apparatus in accordance with the invention comprises the following components as discussed in detail below.

Figure 1:
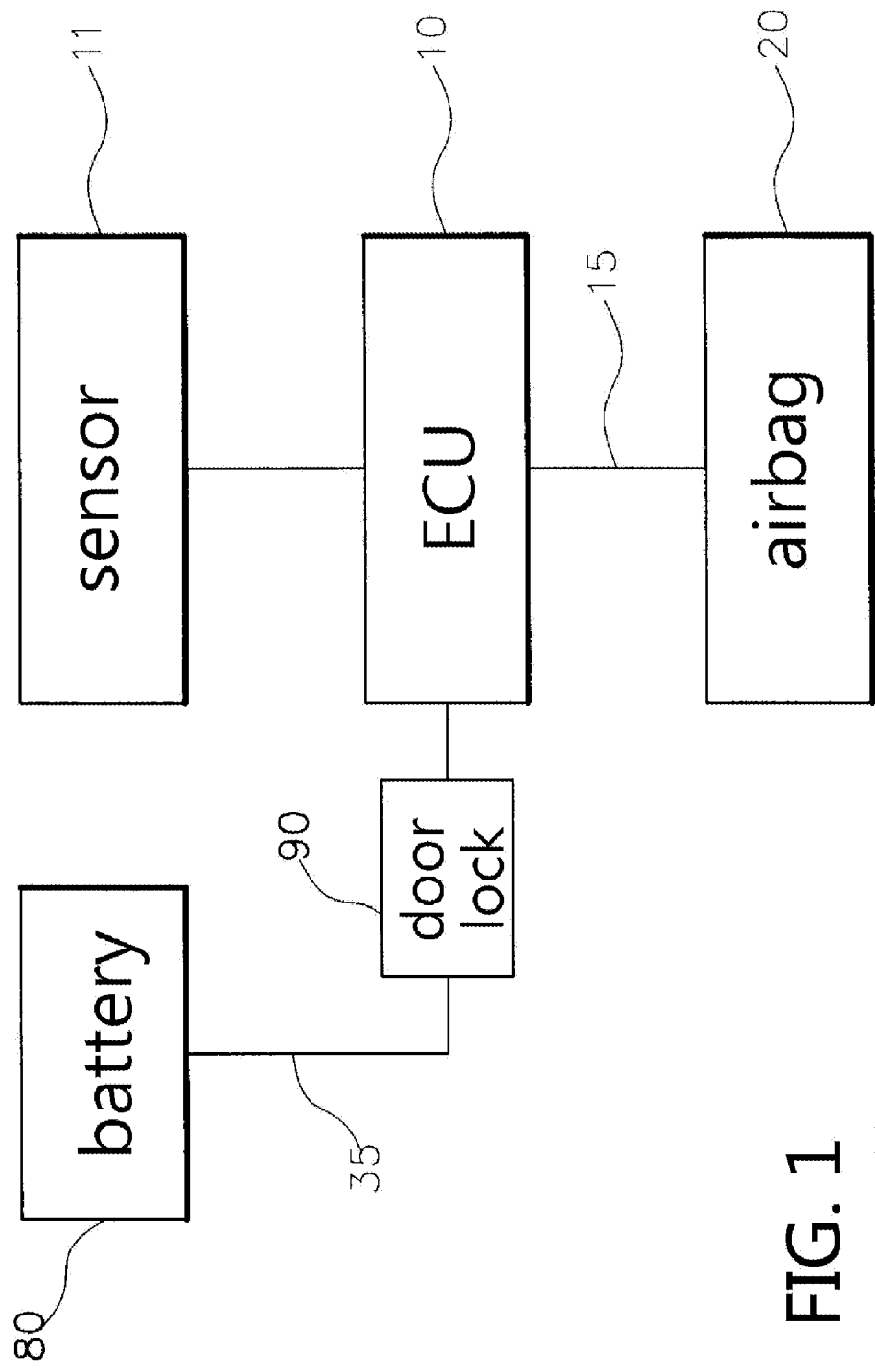
FIG. 1 is a block diagram of a first conventional airbag apparatus.
Figure 2:
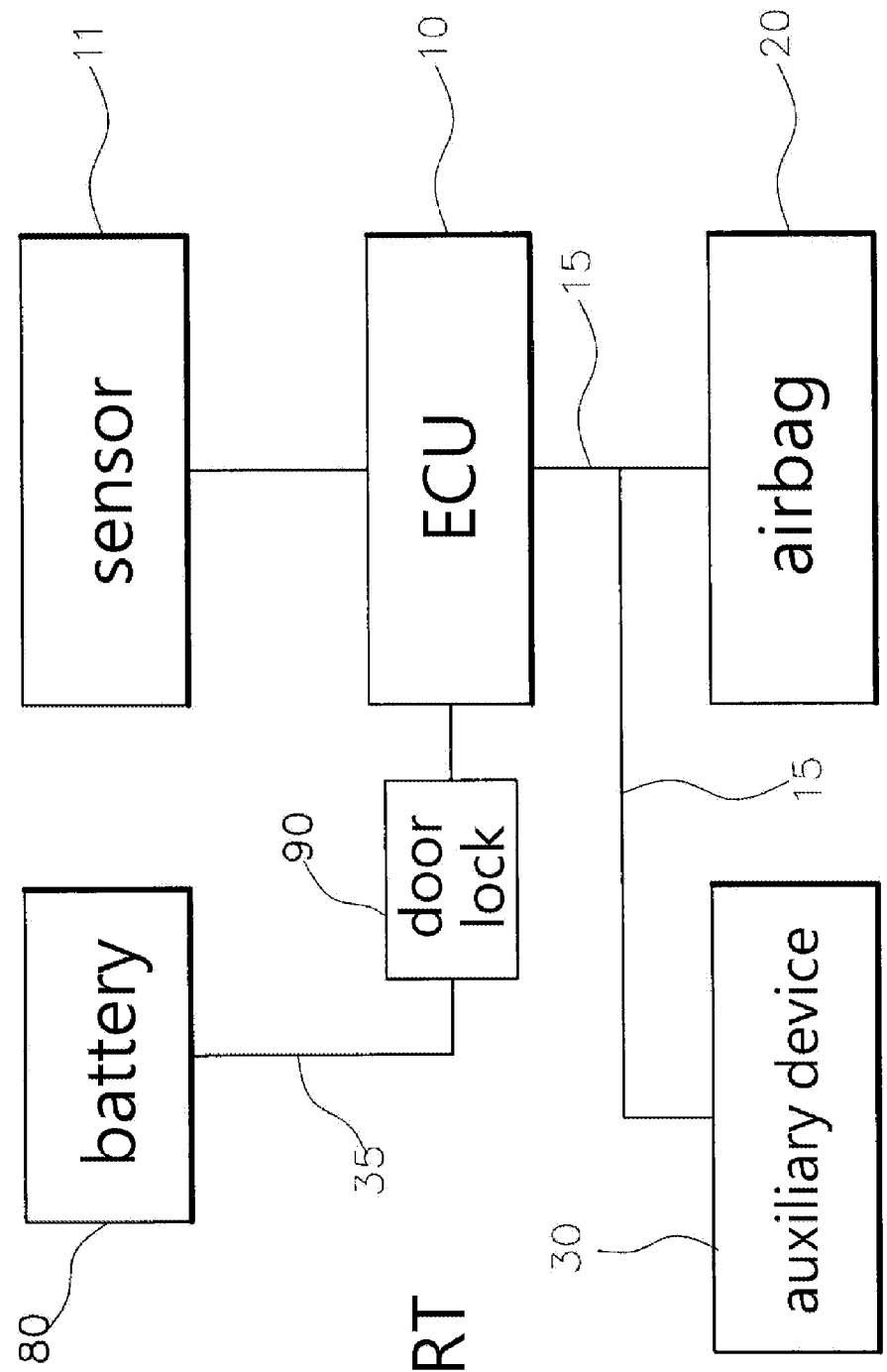
FIG. 2 is a block diagram of a second conventional airbag apparatus.
Figure 3:
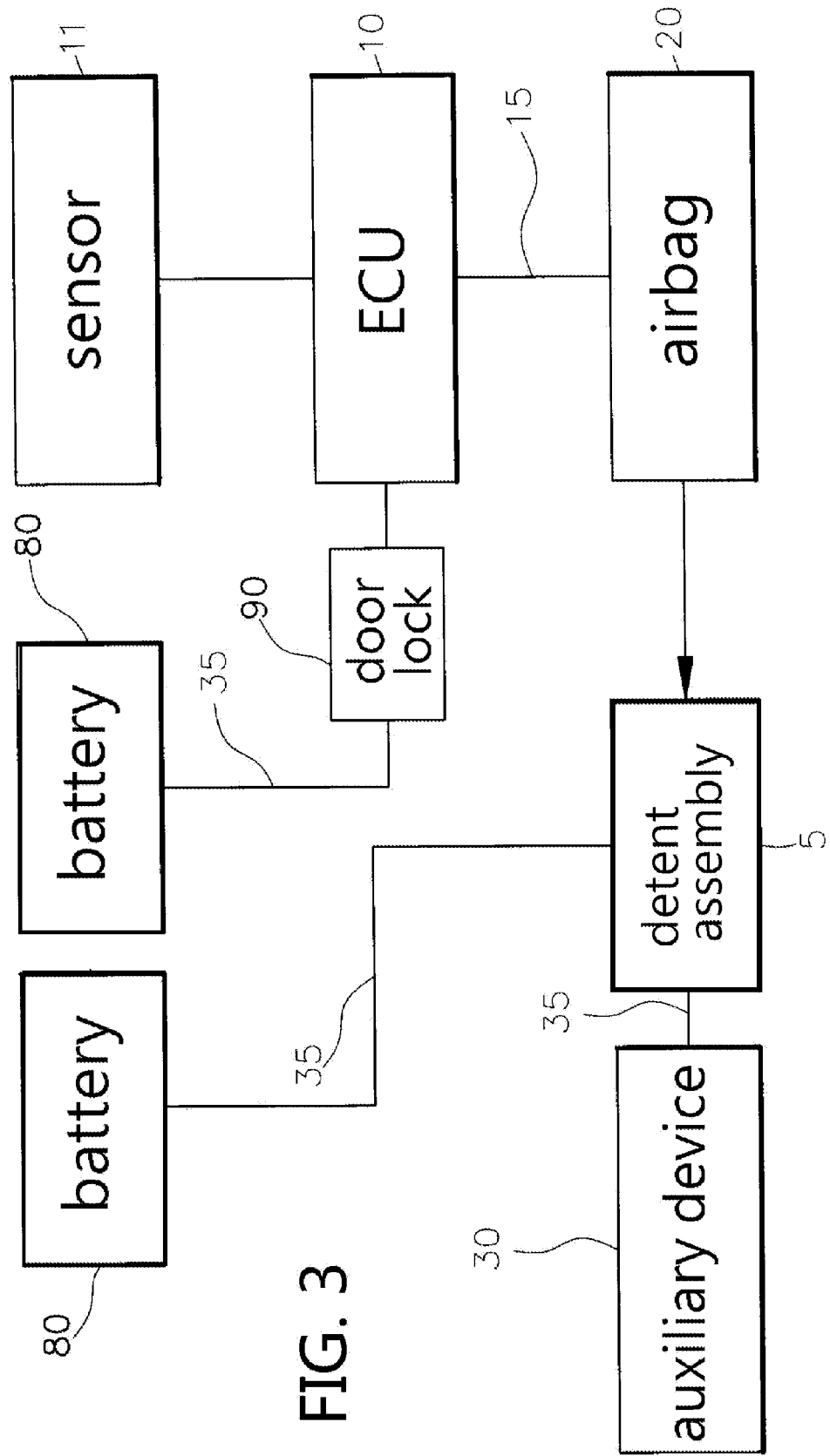
FIG. 3 is a block diagram of an airbag apparatus according to the invention.

In FIG. 3, an electric door lock 90 is unlocked. Then a driver may drive the car. A sensor 11 may sense if a traffic accident occurs. Thus, a signal is sent from the sensor 11 to an ECU 10 via cable 15. The ECU 10 may immediately activate a plurality of airbags 20 to expand. Also, the ECU 10 is connected to the door lock 90 which is in turn powered by a battery 80 via an electric wire 35.

Also as shown in FIG. 3, an auxiliary device (e.g., fire extinguisher, device for extracting a steering wheel, or the like) 30 is provided. A detent assembly 5 is connected between the auxiliary device 30 and the battery 80 via an electric wire 35. Preferably, the ECU 10 controls the airbag 20. The auxiliary device (e.g., fire extinguisher) 30 may be activated by the airbag 20. The ECU 10 can immediately activate the airbag 20. Thus, sensitivity of the system is greatly improved.

The invention comprises the following components:

An ECU and a plurality of sensors are provided. The sensors can sense an actual accident event and inform the ECU for immediate action such as airbags expansion. The airbags are mounted in the steering wheel, besides the instrument panel, and both sides of the car. Thus, the sensors can sense an actual accident event and inform the ECU for immediately expanding the airbags.

A plurality of detent assemblies are connected to the auxiliary device and the battery respectively. The detent assemblies are deactivated by the expanding airbags. Alternatively, the detent assemblies are deactivated by measuring temperature change.

One or more auxiliary devices are provided for increasing security. The auxiliary devices are comprised of fire extinguishers, device for extracting a steering wheel, or the like. The auxiliary devices are also integrated with GPS, 3G, CCD, Smart phones, Tablet PCs, etc. for purposes of alarm and help.

The detent assemblies are deactivated by the expanding airbags so as to activate the auxiliary devices for increasing security.

The invention comprises an ECU 10, a plurality of airbags 20, at least one auxiliary device 30, a plurality of detent assemblies 5, and a battery 80. They are interconnected by electric wires 35. The airbag 20 is associated with a plurality of adjacent detent assemblies 5. The detent assembly 5 is connected to the auxiliary devices 30 via the electric wire 35 and the battery 80 via the electric wire 35. The detent assemblies 5 and the auxiliary devices 30 are activated by the expanding airbags 20 in case of an actual accident event occurrence. The auxiliary devices 30 are comprised of fire extinguishers, device for extracting a steering wheel, or the like. The auxiliary devices 30 are also integrated with GPS, 3G, CCD, Smart phones, Tablet PCs, etc. for purposes of alarm and help.

The present invention has obtained the following patents about the auxiliary devices 30:

Device for extracting a steering wheel of vehicle: Taiwan Utility Model No. M322352 and China Invention Patent No. ZL200710093640.1. They are directed to device for extracting a steering wheel of vehicle in case of an actual accident event occurrence.

Shock and energy dissipating device: Taiwan Invention Patent No. I268234, China Invention Patent No. CN200610122570.3 and ZL2061079858.7, and U.S. Pat. No. 7,341,645. The device includes cylinders attached to an outer peripheral portion of the vehicle for being actuated when a force is applied onto the outer peripheral portion of the vehicle. The device can absorb and dissipate energy that may be transmitted to vehicle drivers or passengers of the vehicle in case of traffic accident.

Fire warning device: Taiwan Utility Model No. M323306. It can warn vehicle occupants prior to fire occurrence.

In the airbag 20, an initiator is used to ignite solid propellant inside the airbag 20. The burning propellant generates inert gas which rapidly inflates the airbag 20 in no more than approximately 45 milliseconds. An airbag 20 must inflate quickly in order to be fully inflated by the time the forward-traveling occupant reaches its outer surface. Further, the detent assemblies 5 are deactivated by the expanding airbag 20. The operation of the auxiliary device 30 is similar.

The detent assembly 5 is disposed adjacent to the airbag 20 and its structure and operation are detailed below.

Figure 4:
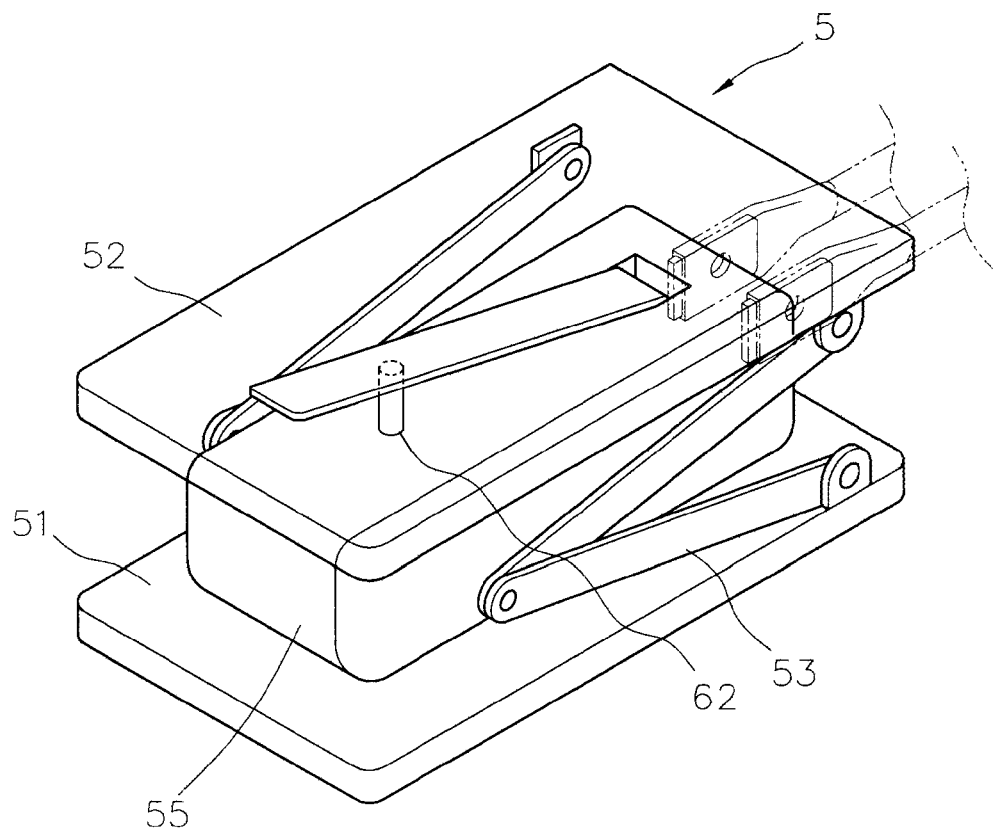
FIG. 4 is a perspective view of a detent assembly according to a first preferred embodiment of the invention.

As shown in FIGS. 4 to 6, a first preferred embodiment of a detent assembly 5 is shown. The detent assembly 5 comprises a restraint member 50, a base 51 secured to a thin cover 44, a plate member 52 spaced from the base 51, two toggle arms 53 interconnecting the base 51 and the plate member 52, a micro pressure switch 55 controlled by the ECU 10, attached to the restraint member 50 and disposed on the base 51 and under the plate member 52 by a small distance so as to close the switch 55 in a normal position. A telescopic cylinder 62 extends from the switch 55 to terminate at the plate member 52.

The airbag 20 expands to close the switch 55 when an accident is sensed by one of sensors 70 controlled by the ECU 10. The expanding airbag 20 breaks the cover 44 at a cavity 45.

Figure 7:
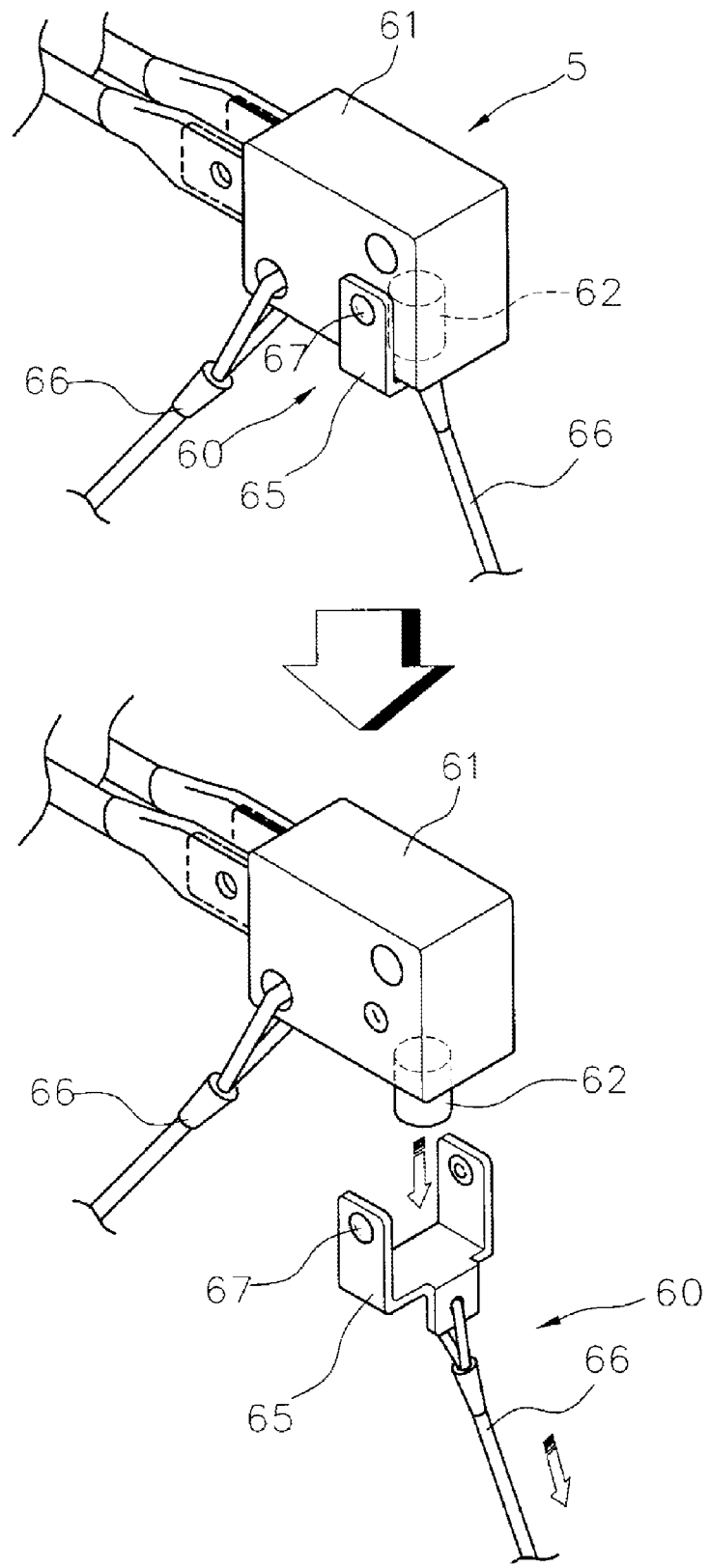
FIG. 7 is a perspective view of a detent assembly according to a second preferred embodiment of the invention.
Figure 9:
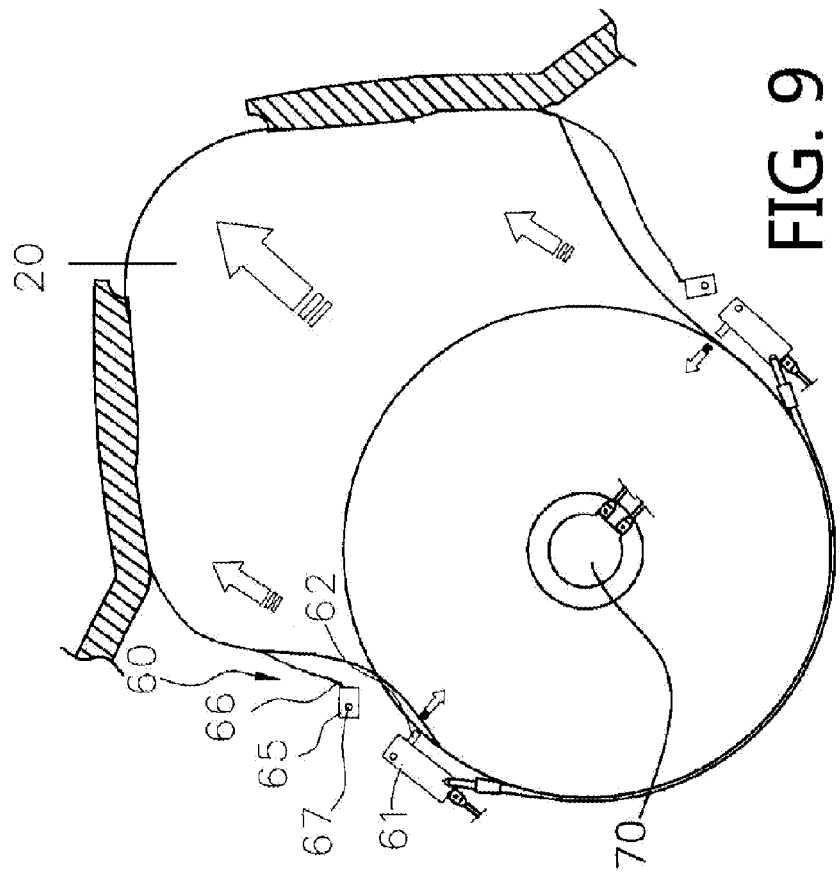
FIG. 9 is a view similar to FIG. 8 showing the airbag expanding to break the cover when a traffic accident occurs.
Figure 8:
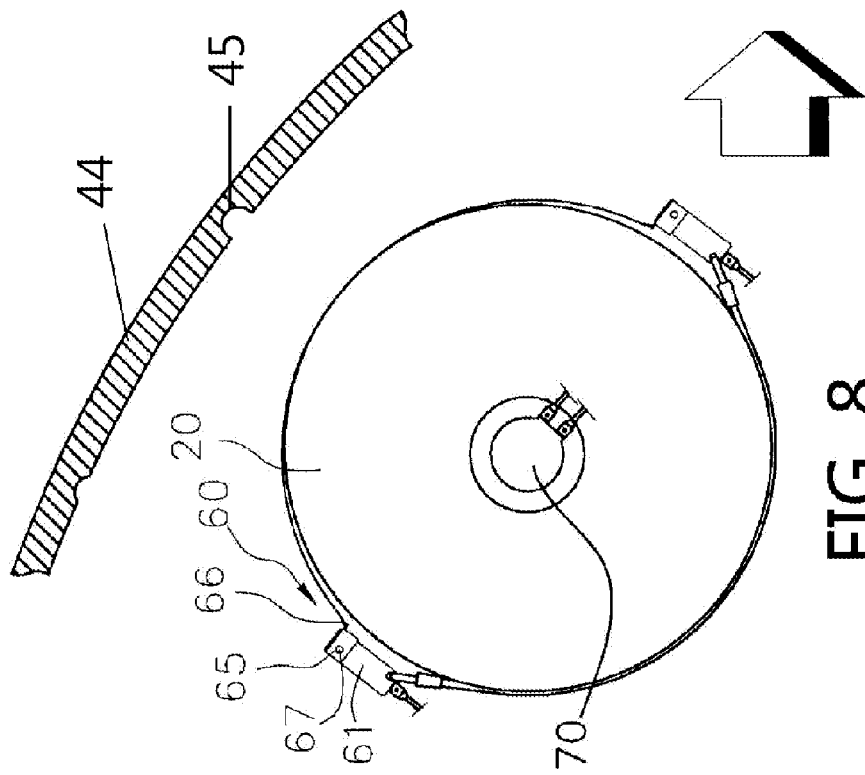
FIG. 8 is a side elevation in part section of an airbag, the detent assemblies of FIG. 7, and a cover mounted in an automobile.

As shown in FIGS. 7 to 9, a second preferred embodiment of a detent assembly 5 is shown. The detent assembly 5 is implemented as a first detent assembly 60 comprising a micro extending switch 61 controlled by the ECU 10, a telescopic cylinder 62 slidably disposed in the micro extending switch 61, a bifurcation 65 for fastening the cylinder 62 by using two opposite projections 67 attached to the micro extending switch 61, and two ropes 66 in which one loops around one edge of the micro extending switch 61 and the other loops around a tab of the bifurcation 65. The other end of each rope 66 is attached to a corresponding end of a rope 66 of a second detent assembly 60. The airbag 20 is thus secured by the surrounding ropes 66.

The switch 61 is open in normal position. The airbag 20 expands to close the switch 61 when an actual accident event is sensed by the sensor 70. The expanding airbag 20 breaks the connection of the ropes 66 to the switch 61 with the help of the extending cylinders 62. Further, the airbag 20 may break the cover 44 at a cavity 45.

Both the micro pressure switch 55 and the micro extending switch 61 are compact for facilitating assembly. Further, they can be replaced with commercially available pressure control switch 41 or pulling control switch 42. A plurality of pressure control switches 41 are mounted in a rear portion of an automobile 100. Also, a pulling control switch 42 or a pressure control switch 41 is mounted in the interior of the automobile 100. Both the pressure control switch 41 and the pulling control switch 42 can be activated by a vehicle occupant in case of traffic accident or engine fire.

Figure 11:
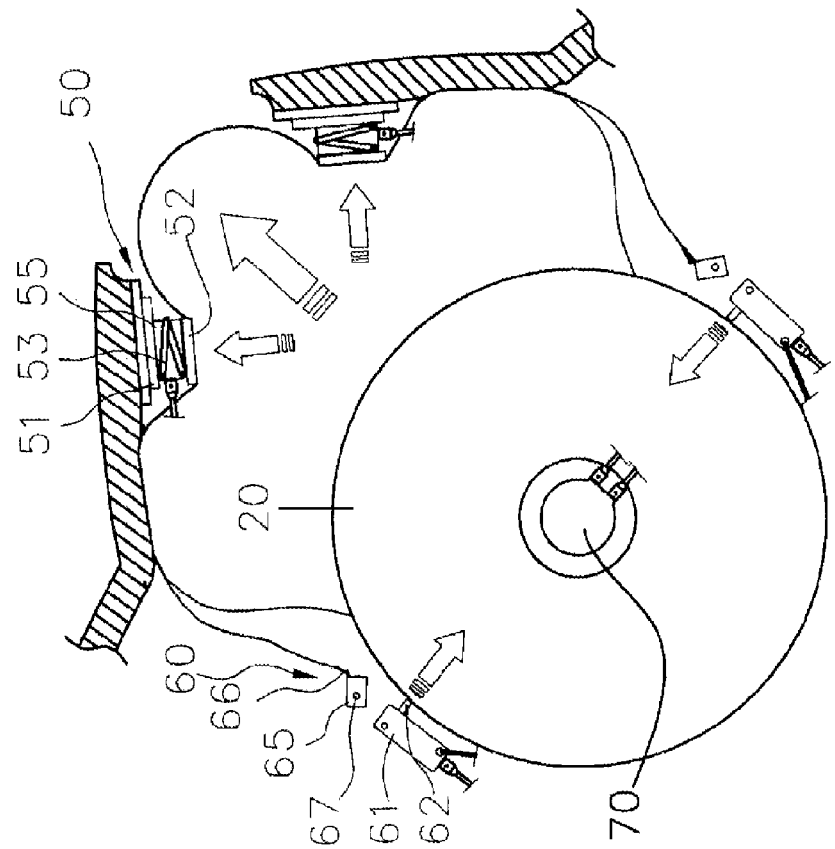
FIG. 11 is a view similar to FIG. 10 showing the airbag expanding to break the cover when a traffic accident occurs.
Figure 10:
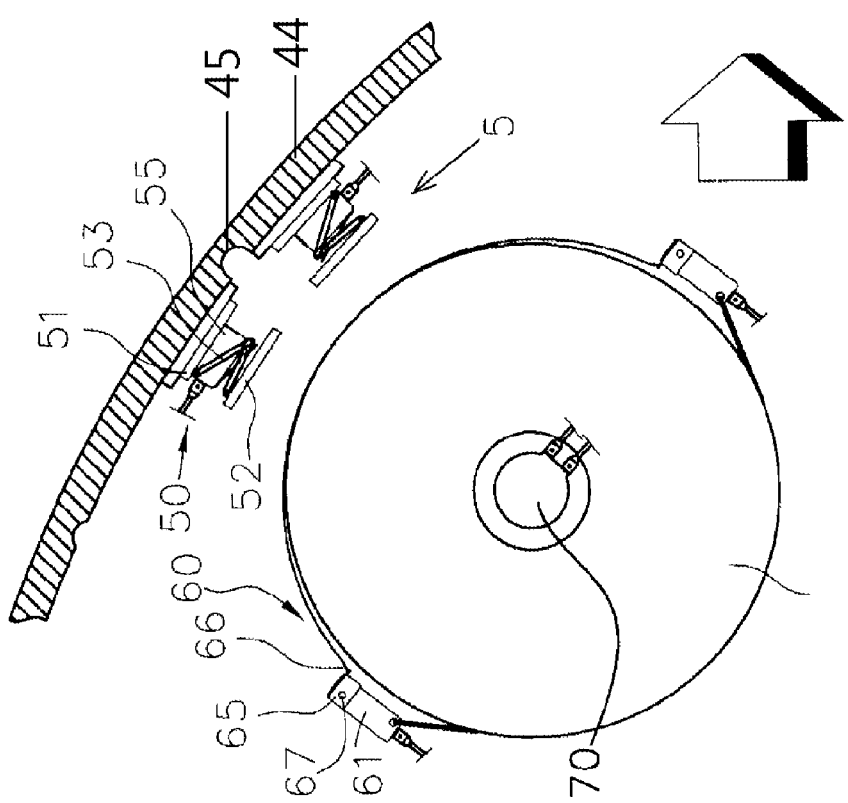
FIG. 10 is a side elevation in part section of an airbag, the detent assemblies and a cover mounted in an automobile according to a third preferred embodiment of the invention.

As shown in FIGS. 10 and 11, a third preferred embodiment of an airbag apparatus is shown. The third preferred embodiment is a combination of the first and second preferred embodiments.

Figure 12:
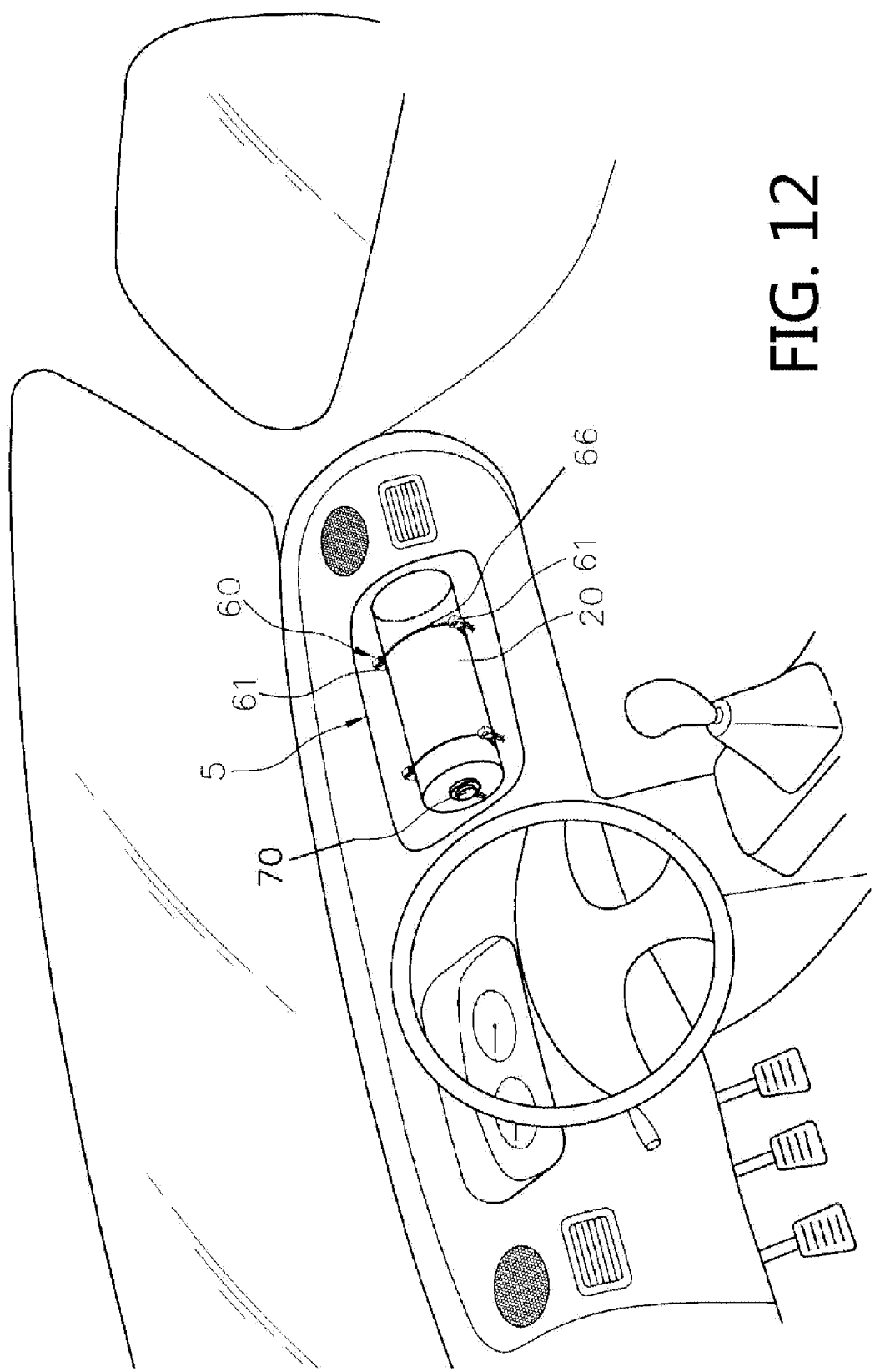
FIG. 12 is an environmental view of the airbag apparatus mounted besides an instrument panel of an automobile according to a fourth preferred embodiment of the invention.

Referring to FIG. 12, a fourth preferred embodiment of the detent assembly 5 is shown and implemented as below. The sensor 70 is mounted to one end of an airbag 20. The airbag 20 may expand when temperature measurement is at least 70° C. and/or explosion noise is at least 120 db. This is particularly applicable for engine fire, arson, terrorist attacks, etc.

Figure 13:
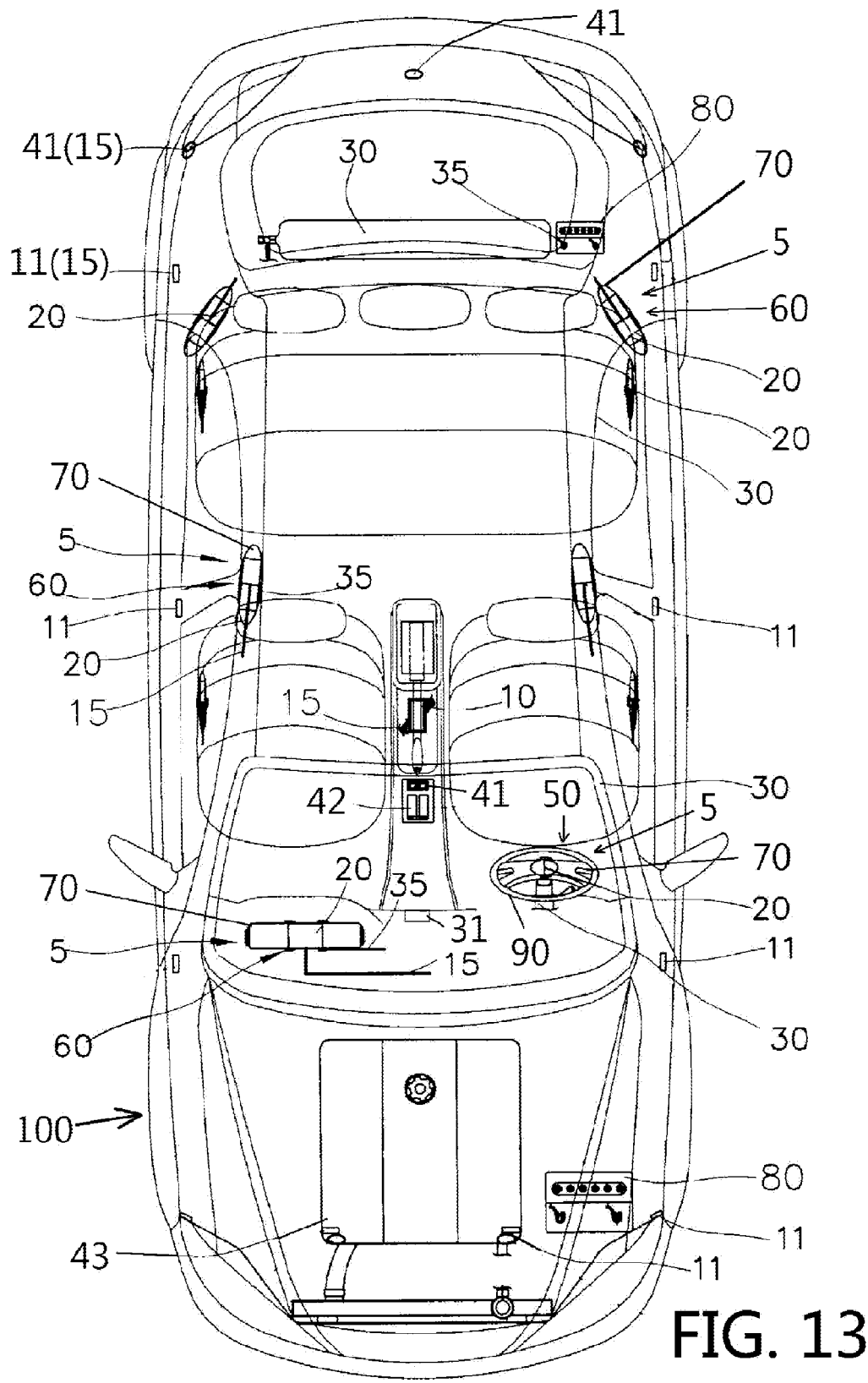
FIG. 13 is a top view schematically depicting a safety system integrating the airbag apparatus of the invention in an automobile.

As shown in FIG. 13, the airbag apparatus of the invention may be installed with GPS, 3G, CCD, Smart phone 31, and Tablet PC in areas including engine 43 of an automobile 100 so as to provide additional functions such as help, warning, etc.

In brief, the detent assembly 5 can be deactivated by the airbag 20 to activate the auxiliary device 30 so as to provide improved security to driving. Moreover, the auxiliary devices 30 are expected to integrate with the ECU 10 and the airbag 20 as requisite components of a modern automobile 100.

While the invention has been described in terms of preferred embodiments, those skilled in the art will recognize that the invention can be practiced with modifications within the spirit and scope of the appended claims.

What is claimed is:

1. An airbag apparatus of an automobile comprising:
   two first detent assemblies each comprising a micro switch, a telescopic cylinder slidably disposed in the micro switch, a bifurcation for fastening the cylinder by attaching to the micro switch, a first rope secured to the micro switch, and a second rope secured to the bifurcation;
   a second detent assembly comprising a micro switch, a telescopic cylinder slidably disposed in the micro switch, a bifurcation for fastening the cylinder by attaching to the micro switch, and a rope secured to the bifurcation and the micro switch;
   an airbag;
   a plurality of sensors disposed in the automobile; and
   an ECU for controlling the airbag and the sensors;
   wherein the airbag is surrounded and fastened by the first and second ropes of the first detent assemblies or the rope of the second detent assembly;
   wherein at least one of the first and second detent assemblies is activated; and
   wherein the airbag expands to close the micro switches of the first and second detent assemblies immediately when an actual accident event is sensed by the sensors.

2. The airbag apparatus of claim 1, wherein each respective micro switch of the first and second detent assemblies is a micro pressure switch disposed on a rear portion of the automobile for being activated when a collision occurs at the rear portion of the automobile.

3. The airbag apparatus of claim 1, wherein each respective micro switch of the first and second detent assemblies is a micro pressure switch disposed in the automobile for being manually activated to extinguish a fire in cooperation with a fire warning device when a fire occurs in the automobile.

4. An airbag apparatus of an automobile comprising:
   at least one detent assembly each comprising a restraint member, a base secured to a cover, a plate member spaced from the base, two toggle arms interconnecting the base and the plate member, and a micro switch attached to the restraint member, the micro switch disposed on the base and under the plate member, the micro switch being open in an inoperative position;
   a telescopic cylinder extending from the micro switch of each respective detent assembly of the at least one detent assembly to terminate at the plate member;
   an airbag;
   a cover spaced around the airbag;
   a plurality of sensors disposed the automobile; and
   an ECU for controlling the airbag and the sensors;
   wherein the airbag expands to close the micro switch of each respective detent assembly of the at least one detent assembly immediately when an actual accident event is sensed by the sensors.

5. The airbag apparatus of claim 4, wherein the micro switch of each respective detent assembly of the at least one detent assembly is a micro pressure switch.

6. An airbag apparatus of an automobile comprising:
   two detent assemblies each comprising a micro switch, a telescopic cylinder slidably disposed in the micro switch, a bifurcation for fastening the cylinder by attaching to the micro switch, a first rope secured to the micro switch, and a second rope secured to the bifurcation, wherein the airbag is surrounded and fastened by the first and second ropes of the detent assemblies;
   an airbag;
   a cover spaced around the airbag;
   a plurality of sensors disposed in the automobile; and
   an ECU for controlling the airbag and the sensors;
   wherein at least one of the sensors is disposed at one end of the airbag; and
   wherein the airbag expands to close the micro switches of the detent assemblies when an actual accident event is sensed by the sensors.

7. The airbag apparatus of claim 6, wherein the micro switch of each respective detent assembly of the detent assemblies is a micro pressure switch.

\* \* \* \* \*